United States Patent Office 3,118,901
Patented Jan. 21, 1964

3,118,901
3,4-DIHALO ISOTHIAZOLO[4,5,d]ISOTHIAZOLE AND PREPARATION THEREOF
William R. Hatchard, Wilmington, Del., assignor to E. I. du Pont de Nemours and Company, Wilmington, Del., a corporation of Delaware
No Drawing. Filed Apr. 30, 1962, Ser. No. 191,388
10 Claims. (Cl. 260—302)

This invention relates to new heterocyclic compounds containing the isothiazole structure and to their preparation.

Compounds containing the isothiazole structure

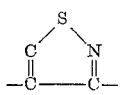

have been unknown until recently except in the form of bicyclic compounds where the isothiazole nucleus is fused to a benzene nucleus, i.e., benzoisothiazoles. Isothiazoles wherein the ring carbon atoms bear monovalent substituents were first reported in 1956 by Adams and Slack (Chemistry and Industry, 1956, 1232). Compounds containing two fused isothiazole rings, i.e., isothiazoloisothiazoles, have been wholly unknown heretofore.

The new isothiazoles provided by this invention are the 3,4-dihaloisothiazolo[4,5,d]isothiazoles of the formula

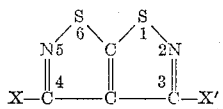

wherein each of X and X', which can be alike or different, is a halogen atom of atomic number 17–35, i.e., chlorine or bromine. (The ring atoms are numbered in the above formula for easier reference).

These compounds can be prepared by a process which comprises (1) treating a 5,5-dithiobis(3-halo-4-isothiazolecarbonitrile), wherein the halogen atoms are chlorine or bromine, with a halogenating agent (chlorine or bromine) to form the intermediate 3-halo-4-cyano-5-isothiazolesulfenyl halide, and (2) subjecting said intermediate to mild heating, whereby cyclization takes place with formation of the corresponding 3,4-dihaloisothiazolo[4,5,d]isothiazole. Reactions (1) and (2) can be carried out as one or two-step operation depending on the temperatures employed. The process is represented by the following equations, wherein X and X' are as defined above:

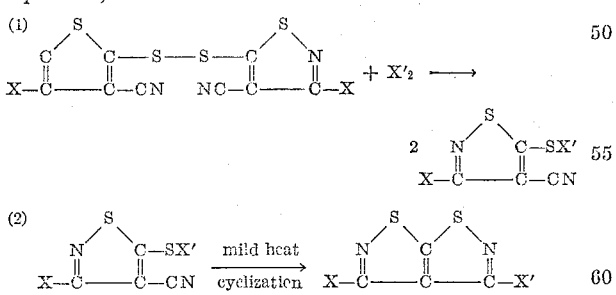

To effect reaction (1) of this process, a 5,5'-dithio-bis(3-halo-4-isothiazolecarbonitrile), whose preparation will be described later, is reacted with a halogen (chlorine or bromine), the halogen being used in a mole ratio of at least 1:1 with respect to the other reactant, and preferably in excess thereover. The reaction is most conveniently, but not necessarily, carried out in an inert organic solvent for the reactants and reaction product, for example, in an aromatic hydrocarbon or a halogenated aliphatic or aromatic hydrocarbon. Heating is not necessary and the reaction can take place at temperatures as low as 0° C.

A temperature in the range of 15–50° C. is most convenient, although, if desired, the reaction mixture can be warmed, there being in general no advantage in exceeding temperature of about 100° C. The reaction is substantially completed in a very short time but no harm is done by prolonging the contact time for several hours.

The resulting 3-halo-4-cyano-5-isothiazolesulfenyl halide need not be isolated prior to cyclization. However, it can be isolated, if desired, by evaporating the solvent and excess halogen, if any, at reduced pressure and a temperature preferably not exceeding 40–50° C. if substantial cyclization is to be avoided.

Reaction (2) of the process is effected simply by mild heating of the 3-halo-4-cyano-5-isothiazolesulfenyl halide. Although some cyclization occurs at temperatures as low as 40° C., the reaction proceeds to substantial completion faster if the sulfenyl halide intermediate is heated to a temperature of 60–100° C. This operation can be carried out on the solvent-free sulfenyl halide, or on a solution of it in an inert solvent, which may be, but is not necessarily, the same as that used in reaction (1). The solution can be heated under reflux or in a closed vessel, or evaporated to dryness, leaving the final reaction product as the residue.

Alternatively, both reactions can be carried out as a one-step operation merely by contacting the halogenating agent with the 5,5'-dithiobis(3-halo-4-isothiazolecarbonitrile) at a temperature of about 40–100° C., preferably 60–100° C. Under these conditions, cyclization of the sulfenyl halide intermediate will occur spontaneously as it is formed.

It should be noted that this process makes it possible, if desired, to obtain mixed 3,4-dihaloisothiazolo[4,5,d] iso-thiazoles, i.e., products in which one of the halogen atoms is chlorine and the other bromine. This can be done by brominating 5,5'-dithiobis(3-chloro-4-isothiazolecarbonitrile) or by chlorinating 5,5'-dithiobis(3-bromo-4-isothiazolecarbonitrile), the disulfide linkage in either case being cleaved by the halogen used to give the corresponding sulfenyl halide as the intermediate.

3,4-dichloroisothiazolo[4,5,d]isothiazole can also be prepared by another method, which consists in chlorinating 2,2-dicyano-1,1disodiomercaptoethylene. This reaction is represented by the equation

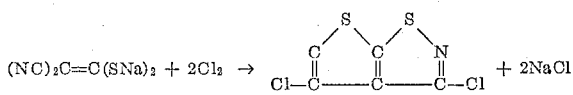

The major product of this reaction is, however, a different compound, 3,5-dichloro-4-isothiazolecarbonitrile,

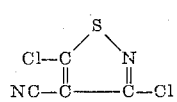

this compound and its preparation by this method being described in copending, coassigned application S.N. 152,174, filed November 14, 1961. The reaction is conveniently conducted in an inert liquid medium, such as an aliphatically saturated halogenated hydrocarbon. The reaction is exothermic and requires no external heat. The organic reaction product can be isolated by evaporation of the medium after removal of the sodium chloride, and the residue can be extracted with a suitable solvent to isolate the 3,4-dichloroisothiazolo[4,5,d]isothiazole present therein.

Both methods are illustrated in the examples which follow.

EXAMPLE I

*3,4-Dichloroisothiazolo[4,5,d]Isothiazole*

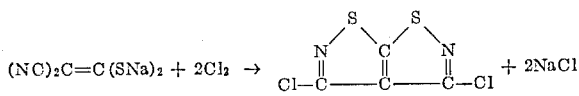

A vigorous stream of chlorine gas was passed into a stirred slurry of 20 g. (0.108 mole) of 2,2-dicyano-1,1-disodiomercaptoethylene in 200 ml. of distilled carbon tetrachloride. The mixture was quickly heated to reflux by the heat of reaction. The chlorine flow was continued for about one hour, when the heat evolution ceased. After standing overnight, the reaction mixture was filtered to separate the sodium chloride and the filtrate was concentrated in a stream of nitrogen to give an oily crystalline residue. The residue was a mixture consisting principally of 3,5-dichloro-4-isothiazolecarbonitrile,

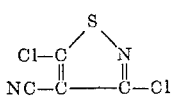

with a smaller amount of 3,4-dichloroisothiazolo[4,5,d]-isothiazole. The first component was separated by extraction of the mixture with warm petroleum ether (B.P. 30–60° C.) in which it is soluble, followed by concentration of the petroleum ether extract and steam distillation, whereby it was obtained as a white crystalline solid, M.P. 64–65° C. The insoluble residue from the petroleum ether extraction consisted of 2.0 g. of an orange solid, M.P. 160–170° C., which, on sublimation under reduced pressure, yielded white crystals of 3,4-dichloroisothiazolo[4,5,d]isothiazole, M.P. 183–185° C.

*Analysis.*—Calc'd for $C_4Cl_2N_2S_2$: C, 22.77; Cl, 33.61; N, 13.38; S, 30.39. Found: C, 23.03; Cl, 33.48; N, 13.50; S, 30.46.

Ultraviolet: $\lambda_{max.}$ in $CH_2Cl_2$: 255 m$\mu$ ($\epsilon$=4600), 263 m$\mu$ ($\epsilon$=5690), 270 m$\mu$ ($\epsilon$=4980), 278 m$\mu$ ($\epsilon$=3330).

Infrared: weak absorption at 6.55$\mu$ and 6.8$\mu$.

The 2,2-dicyano-1,1-disodiomercaptoethylene used as the starting material in this example may be prepared and isolated by the following modification of the procedure described in U.S. Patent 2,533,233:

Malononitrile (66 g., 1 mole) was added slowly to a suspension of 80 g. (2 moles) of sodium hydroxide in 900 ml. of 95% alcohol while the temperature of the mixture was maintained below 40° C. Then carbon disulfide (76 g., 1 mole) was added dropwise with cooling over a period of 30 minutes. The heavy, yellow slurry was stirred an additional hour at room temperature and filtered. The yellow residue was triturated in alcohol, collected on a filter and dried in a vacuum oven at 80° C./1 mm. for 24 hours. There was obtained 180 g. (98% yield) of 2,2-dicyano-1,1-disodiomercaptoethylene.

3,4-dichloroisothiazolo[4,5,d]isothiazole showed activity as a pre-emergence herbicide, killing alfalfa, marigold and crabgrass when applied at the rate of 16 lb./acre.

EXAMPLE II 3,4-dichloroisothiazolo[4,5,d]isothiazole was prepared by the following reaction sequence:

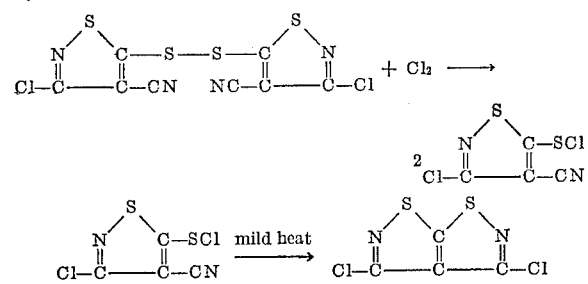

A solution of 1.0 g. of 5,5'-dithiobis(3-chloro-4-isothiazolecarbonitrile) in 50 ml. of warm carbon tetrachloride was saturated with chloride gas, allowed to stand overnight at room temperature, and then evaporated to dryness at reduced pressure and a pot temperature of 30° C. The residue was a bright yellow solid, M.P. 45–47° C., with a strong sulfenyl chloride odor, which was 3-chloro-4-cyano-5-isothiazolesulfenyl chloride.

Cyclization of this product was effected by dissolving it in benzene and boiling the solution to dryness at atmospheric pressure, i.e., at a temperature of about 80° C. The residue consisted of white crystals of 3,4-dichloroisothiazolo[4,5,d]isothiazole, M.P. 183–185° C., which was shown by mixed melting point to be identical with the product of Example I.

The starting material used in the method of this example, 5,5'-dithiobis(3-chloro-4-isothiazolecarbonitrile), may be prepared as follows by the reaction sequence:

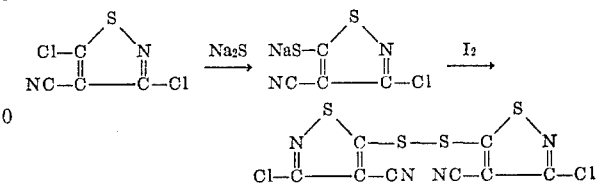

A solution in 40 ml. of methanol of 3.58 g. (0.02 mole) of 3,5-dichloro-4-isothiazolecarbonitrile (prepared as described in Example I) was added to a solution of 4.8 g. (0.02 mole) of sodium sulfide nonahydrate, $Na_2S.9H_2O$ in a mixture of 10 ml. of water and 100 ml. of methanol over a period of 15 minutes at 40–50° C. The reaction mixture was stirred an additional 20 minutes and then cooled to 20° C. To the cooled and stirred mixture, containing the sodium salt of 3-chloro-5-mercapto-4-isothiazolecarbonitrile was added 5.06 g. (0.02 mole) of iodine, and stirring was continued for one hour at room temperature. Filtration of the reaction mixture gave 1.2 g. (34% yield) of light yellow crystals of 5,5'-dithiobis(3-chloro-4-isothiazolecarbonitrile), M.P. 139–140° C. The identity of the product was established by mixed melting point and comparison of the infrared spectra with an authentic sample, prepared by a different method, which had the following characteristics:

*Analysis.*—Calc'd for $C_8Cl_2N_4S_4$: C, 27.35; Cl, 20.22; N, 15.96; S, 36.47; mol. wt., 351. Found: C, 28.30; Cl, 19.72; N, 15.96; S, 36.15; mol. wt., 369. (Ebull. ethylene chloride.)

Infrared: 4,5$\mu$ (CN); 6.72$\mu$ (conj. C=C and/or C=N); 7.5$\mu$ (isothiazole).

5,5'-dithiobis(3-bromo-4-isothiazolecarbonitrile) can be prepared in the same manner starting with 3,5-dibromo-4-isothiazolecarbonitrile, the latter compound (a solid melting at 98.3–98.6° C.) being itself prepared by the reaction of bromine with 2,2-dicyano-1,1-disodiomercaptoethylene, as described in copending application Serial No. 152,-174, already referred to. Reacting bromine in at least molar ratio with 5,5'-dithiobis(3-bromo-4-isothiazolecarbonitrile) in the manner described in Example II gives 3-bromo-4-cyano-5-isothiazolesulfenyl bromide, which cyclizes on mild heating to 3,4- dibromoisothiazolo[4,5,d] isothiazole.

EXAMPLE III

This example illustrates the preparation of 3-bromo-4-chloroisothiazolo[4,5,d]isothiazole using the starting material and the procedure of Example II but with bromine as the halogenating agent.

A mixture of 1.5 g. of 5,5'-dithiobis(3-chloro-4-isothiazolecarbonitrile), 95 ml. of carbon tetrachloride and 0.8 ml. of bromine was allowed to stand at room temperature for 5 days and then filtered from a small amount of an orange solid. The filtrate was formed for a few minutes to near the boiling point of carbon tetrachloride, i.e., to about 75° C., and then it was evaporated to dryness. This gave 1.4 g. of light yellow solid that melted at 108–113° C. and whose infrared spectrum indicated that it contained some starting material mixed with the reaction product. A sample of this mixture was subjected to sublimation at 120° C. at oil pump pressure to give a white sublimate, M.P. 135–137° C., of 3-bromo-4-chloroisothiazolo[4,5,d]isothiazole.

*Analysis.*—Calc'd for $C_4BrClN_2S_2$: C, 18.80. Found: C, 19.25.

The infrared spectrum supported the assigned structure and showed none of the absorption bands of the starting material.

The 3,4-dihaloisothiazolo[4,5,d]isothiazoles of this invention are useful as herbicides. This has been demonstrated in Example I. A further use for 3,4-dichloroisothiazolo[4,5,d]isothiazole lies in its conversion to 3-chloro-4-cyano-5-isothiazolesulfenamides by reaction with a primary or secondary amine, the molar ratio of amine to isothiazole being at least 2:1. These sulfenamides are effective as rubber vulcanization accelerators. For example, when a mixture of 0.01 mole of 3,4-dichloroisothiazolo[4,5,d]isothiazole and 0.04 mole of morpholine in tetrahydrofuran (inert solvent) was heated under reflux for 5 hours, 3-chloro-4-cyano-5-isothiazolesulfenylmorpholine was obtained. This product was found to be an effective vulcanization accelerator when tested on synthetic rubber (25/75 styrene/butadiene copolymer) and natural rubber. These tests involved determination of Mooney Scorch (ASTM Method D1646–59T) and stress-strain data as determined by the Scott machine (ASTM Method D412–51T).

Since obvious modifications and equivalents in the invention will be apparent to those skilled in the chemical arts, I propose to be bound solely by the appended claims.

The embodiments of the invention in which an exclusive property or privilege is claimed are defined as follows:

I claim:
1. A compound of the formula:

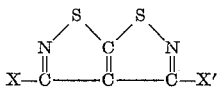

wherein each of X and X′ is a halogen of atomic number 17–35.

2. 3,4-dichloroisothiazolo[4,5,d]isothiazole.
3. 3-bromo-4-chloroisothiazolo[4,5,d]isothiazole.
4. The process which comprises reacting a halogen of atomic number 17–35 with a 5,5′-dithiobis(3-X-4-isothiazolecarbonitrile), wherein X is a halogen of atomic number 17–35, at a temperature of from 0° C. to about 100° C., the molar ratio of halogen reactant to carbonitrile being at least 1:1.

5. The process of preparing 3,4-dihaloisothiazolo-[4,5,d]isothiazoles which comprises (1) reacting a halogen of atomic number 17–35 with a compound of the formula:

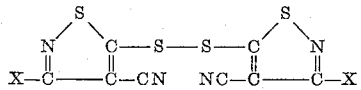

wherein X is a halogen of atomic number 17–35, at a temperature of from 0° C. to about 50° C., the molar ratio of halogen reactant to said compound being at least 1:1, thereby forming 3-halo-4-cyano-5-isothiazole-sulfenyl halide and (2) maintaining said sulfenyl halide at a temperature of 40–100° C.

6. The process of claim 5 where step (2) is conducted at a temperature of 60–100° C.

7. The process of claim 5 wherein step (1) comprises reacting chlorine with 5,5′-dithiobis(3-chloro-4-isothiazolecarbonitrile).

8. The process of claim 5 wherein step (1) comprises reacting bromine with 5,5′-dithiobis(3-chloro-4-isothiazolecarbonitrile).

9. The process of preparing 3,4-dihaloisothiazolo-[4,5,d]isothiazoles which comprises contacting a halogen of atomic number 17–35 with a compound of the formula:

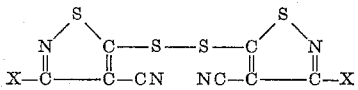

wherein X is a halogen of atomic number 17–35, at a temperature of 60–100° C., the molar ratio of halogen reactant to said compound being at least 1:1.

10. The process of preparing 3,4-dihaloisothiazolo[4,5,d]isothiazoles which comprises heating to a temperature of 60–100° C. a compound of the formula:

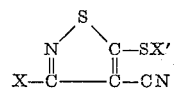

wherein each of X and X′ is a halogen of atomic number 17–35.

No references cited.